United States Patent
Hong et al.

(10) Patent No.: US 10,506,659 B2
(45) Date of Patent: Dec. 10, 2019

(54) METHOD FOR PROCESSING RADIO LINK FAILURE AND APPARATUS THEREFOR

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/927,486

(22) Filed: Mar. 21, 2018

(65) Prior Publication Data

US 2018/0279401 A1 Sep. 27, 2018

(30) Foreign Application Priority Data

Mar. 23, 2017 (KR) .................. 10-2017-0036905
Oct. 23, 2017 (KR) .................. 10-2017-0137582

(51) Int. Cl.
*H04W 76/18* (2018.01)
*H04W 36/00* (2009.01)
(Continued)

(52) U.S. Cl.
CPC ......... *H04W 76/18* (2018.02); *H04J 11/0086* (2013.01); *H04W 36/0055* (2013.01);
(Continued)

(58) Field of Classification Search
CPC ............... H04J 11/0086; H04J 11/0073; H04J 11/0076; H04W 76/15; H04W 24/02;
(Continued)

(56) References Cited

U.S. PATENT DOCUMENTS

2012/0057560 A1\* 3/2012 Park .................. H04L 1/08
370/329
2015/0181638 A1\* 6/2015 Tabet .................. H04W 28/085
370/228
(Continued)

FOREIGN PATENT DOCUMENTS

WO 2015/030483 A1 3/2015

OTHER PUBLICATIONS

Ericsson, "Data duplication in lower layers (HARQ)", Tdoc R2-1702032, 3GPP TSG-RAN WG2 #97, Athens, Greece, Feb. 13-17, 2017, pp. 1-6.
(Continued)

*Primary Examiner* — Awet Haile
(74) *Attorney, Agent, or Firm* — IP Legal Services, LLC

(57) ABSTRACT

Provided are a method and an apparatus for processing a Radio Link Failure (RLF) when duplicate data transmission is performed via single-BS-based CA. The method of processing an RLF by a user equipment (UE) may include: receiving, from a Base Station (BS), higher layer signaling including information for configuring duplicate data transmission via single BS-based CA; configuring a logical channel restricted to one or more secondary cells and a Radio Link Control (RLC) entity for duplicate transmission, based on the higher layer signaling; and transmitting, to the BS, a secondary cell failure report without performing RRC re-establishment procedure, when an RLF occurs in the RLC entity.

12 Claims, 12 Drawing Sheets

(51) Int. Cl.
*H04W 76/34* (2018.01)
*H04J 11/00* (2006.01)

(52) U.S. Cl.
CPC .......... *H04W 76/34* (2018.02); *H04J 11/0073* (2013.01); *H04J 11/0076* (2013.01)

(58) Field of Classification Search
CPC . H04W 36/0083; H04W 76/19; H04W 24/04; H04W 36/0055; H04W 76/18; H04W 36/04; H04W 76/20; H04W 36/0069; H04W 76/34
See application file for complete search history.

(56) References Cited

U.S. PATENT DOCUMENTS

2016/0057800 A1    2/2016   Ingale et al.
2016/0142184 A1*   5/2016   Yi .............................. H04L 1/08
                                                              714/748

OTHER PUBLICATIONS

Intel Corporation, "Packet duplication for URLLC in DC and CA deployment", R2-1700336, 3GPP TSG-RAN WG2 NR Ad-hoc, Spokane, Washington, USA, Jan. 17-19, 2017, pp. 1-3.

* cited by examiner

FIG.8

Uplink AM RLC configuration information

```
UL-AM-RLC ::=                   SEQUENCE {
    t-PollRetransmit                T-PollRetransmit,
    pollPDU                         PollPDU,
    pollByte                        PollByte,
    maxRetxThreshold                ENUMERATED {
                                        t1, t2, t3, t4, t6, t8, t16, t32}
}
```

METHOD FOR PROCESSING RADIO LINK FAILURE AND APPARATUS THEREFOR

CROSS REFERENCE TO RELATED APPLICATION

This application claims priority from Korean Patent Application Nos. 10-2017-0036905 & 10-2017-0137582, filed on Mar. 23, 2017 & Oct. 23, 2017, which are hereby incorporated by reference for all purposes as if fully set forth herein.

BACKGROUND OF THE INVENTION

1. Field of the Invention

The present disclosure relates to a method of performing duplicate transmission of control plane data or user plane data via carrier aggregation. More particularly, the present disclosure relates to a method and an apparatus for processing a radio link failure when duplicate data transmission is performed via single-base station-based carrier aggregation.

2. Description of the Prior Art

As communication systems have developed, various wireless terminals have been introduced to consumers such as companies and individuals.

A current mobile communication system has affiliated with 3rd generation partnership project (3GPP), for example, Long Term Evolution (LTE), LTE-Advanced (LTE-A), 5G, and the like. Such a mobile communication system requires a high-speed and large-capacity communication system capable of transmitting and receiving various data, such as image data, wireless data, and the like, at a high speed.

To this end, a technology associated with a next generation radio access network has been developed to support a larger amount of data transmitted and received by a User Equipment (UE), and to provide higher Quality of Service (QoS) than LTE-A. For example, development of a technology, tentatively named "5G network" is in progress mainly by 3GPPP.

However, a Base Station (BS) may improve a data transmission/reception rate and capacity of a UE using multiple cells configured (provided) by the BS. As an example, the BS and the UE may configure Carrier Aggregation (CA) using multiple carriers, thereby satisfying user requirements.

Particularly, to reliably transmit a service with low latency, such as Ultra-Reliable and Low-Latency Communications (URLLC), there is a need for a reliable method that transmits data at a faster speed without data loss. To this end, a technology for performing duplicate data transmission using multiple cells, with high reliability is required. Particularly, although duplicate data transmission is performed, unnecessary operations of a UE needs to be minimized, which are associated with a data processing procedure or a failure processing procedure for a data processing failure.

However, as described above, currently, operations and procedures for performing duplicate data transmission using multiple cells, and for processing a radio link failure occurring in a predetermined cell during the duplicate transmission, have not yet been disclosed.

SUMMARY OF THE INVENTION

In this background, an aspect of the present disclosure is to provide a method and apparatus for configuring Carrier Aggregation (CA) using multiple cells and performing duplicate data transmission and reception via the carrier-aggregated multiple cells, by a User Equipment (UE) and a Base Station (BS).

Also, another aspect of the present disclosure is to provide a procedure of processing a Radio Link Failure (RLF) when the RLF occurs in a predetermined cell in the case of duplicate data transmission via CA.

In accordance with an aspect of the present disclosure, there is provided a method of processing a radio link failure by a User Equipment (UE), including: receiving, from a base station (BS), higher layer signaling including information for configuring duplicate data transmission via single-BS-based carrier aggregation (CA); configuring a logical channel, which is restricted to one or more secondary cells, and a Radio Link Control (RLC) entity for duplicate transmission, based on the higher layer signaling; and when a radio link failure occurs in the RLC entity, transmitting a secondary cell failure report to the BS without performing an RRC re-establishment procedure.

In accordance with another aspect of the present disclosure, there is provided a method of controlling a radio link failure processing of a UE, by a BS, the method including: transmitting, to the UE, higher layer signaling including information for configuring duplicate data transmission via single-BS-based CA; and receiving a secondary cell failure report transmitted from the UE without performing an RRC re-establishment procedure when a radio link failure occurs in an RLC entity configured for duplicate transmission based on the higher layer signaling, wherein the UE configures a logical channel, which is restricted to one or more secondary cells, and the RLC entity for duplicate transmission based on the higher layer signaling.

In accordance with still another aspect of the present disclosure, there is provided a UE for processing a radio link failure, the UE including: a receiver configured to receive, from a BS, higher layer signaling including information for configuring duplicate data transmission via single-BS-based CA; a controller configured to configure a logical channel, which is restricted to one or more secondary cells, and an RLC entity for duplicate transmission, based on the higher layer signaling; and a transmitter configured to transmit a secondary cell failure report to the BS without performing RRC re-establishment when a radio link failure occurs in the RLC entity.

In accordance with yet another aspect of the present disclosure, there is provided a BS for controlling RLF processing of a UE, the BS including: a transmitter configured to transmit, to the UE, higher layer signaling including information for configuring duplicate data transmission via single-BS-based CA; and a receiver configured to receive a secondary cell failure report transmitted from the UE without performing an RRC re-establishment procedure when an RLF occurs in an RLC entity configured for duplicate transmission based on the higher layer signaling, wherein the UE configures a logical channel, which is restricted to one or more secondary cells, and the RLC entity for duplicate transmission based on the higher layer signaling.

According to the above-described embodiments, a UE and a BS can quickly and accurately transmit and receive ultra-reliable and low-latency data.

Also, according to the embodiments, in the case in which duplicate data transmission and reception is configured, failure processing resources can be prevented from being unnecessarily wasted even though an RLF occurs in a predetermined cell.

BRIEF DESCRIPTION OF THE DRAWINGS

The above and other aspects, features and advantages of the present disclosure will be more apparent from the following detailed description taken in conjunction with the accompanying drawings, in which:

FIG. 8 is a diagram illustrating an example of information included in uplink Acknowledged Mode (AM) RLC configuration information;

DETAILED DESCRIPTION OF THE EXEMPLARY EMBODIMENTS

Figure 1:
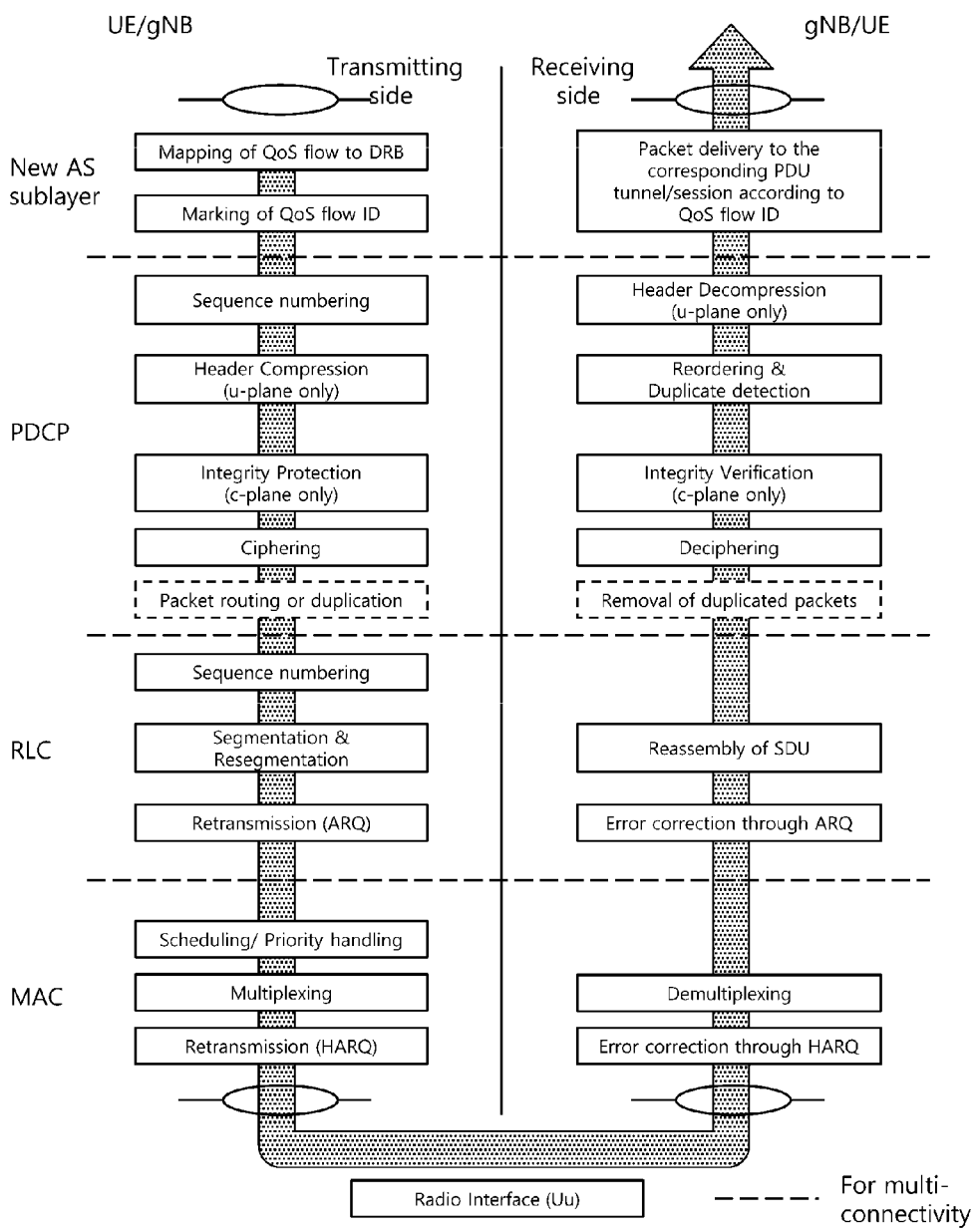
FIG. 1 is a diagram illustrating an example of a layer 2 structure for a new Radio Access Technology (New RAT)

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, a machine type communication (MTC) terminal refers to a terminal that is low cost (or is not very complexity), a terminal that supports coverage enhancement, or the like. In the present specifications, the MTC terminal refers to a terminal that supports low cost (or low complexity) and coverage enhancement. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type.

The wireless communication system may be widely installed to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), LTE, high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell, and thus, the base station may be construed in two ways. i) the base station may be a device itself that provides a megacell, a macrocell, a microcell, a picocell, a femtocell, and a small cell in association with a wireless area, or ii) the base station may indicate a wireless area itself. In i), all devices that interact with one another to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. In ii), a wireless area itself that receives or transmits a signal from a perspective of a terminal or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and the user equipment and the base station may not be limited to a predetermined term or word. In the specification, the user equipment and the base station are used as two (uplink or downlink) inclusive transceiving subjects to embody the technology and technical concepts described in the specifications, and the user equipment and the base station may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field. Furthermore, the present disclosure may include all technical fields in which the technical idea of the present disclosure is applicable.

Uplink transmission and downlink transmission may be performed based on i) a TDD (Time Division Duplex) scheme that performs transmission based on different times, or ii) an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PITCH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, so as to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is controlled through the optical cable or the optical fiber, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In an uplink, a transmitter may be a part of a terminal and a receiver may be a part of a multiple transmission/reception point. In an uplink, a transmitter may be a part of a terminal and a receiver may be a part of a multiple transmission/reception point.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB may transmit a Physical Downlink Shared Channel (PDSCH) which is a primal)/physical channel for unicast transmission, and the eNB may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will As representative usage scenarios of New Radio (NR) which is being discussed by 3GPP, there are enhanced Mobile Broadband (eMBB), massive Machine Type Communication (mMTC), and Ultra Reliable and Low Latency Communication (URLLC).

A frequency, a frame, a sub-frame, a resource, a resource block, a region, a band, a sub-band, a control channel, a data channel, a synchronization signal, various reference signals, various signals, and various messages, which are associated with New Radio (NR) in the present specification, may be interpreted as having various meanings which were used in the past, which are currently used, or which will be used in the future.

For example, LTE and NR in the present specification indicate different radio access technologies. Descriptions will be provided by referring to a new radio access technology, which is currently discussed by Release-15 of 3GPP, as NR When compared to LTE, NR may include differences such as different frame structures, different channels, different core network technologies, or the like, and may additionally include various functions for wireless transmission in a high-bandwidth, ultrahigh-speed data transmission, or high-capacity data transmission.

Hereinafter, for ease of description, descriptions will be provided by referring to the typical radio access technology as LTE and referring to the new radio access technology currently discussed by 3GPP as NR Also, a Base Station (BS) may be an eNB that uses LTE or may be a gNB that uses NR, and descriptions will be provided by separating BSs as an eNB and a gNB as needed.

Also, a cell in the present specification may be used as a term that embraces a wireless path for data transmission, a radio link, a carrier, or the like, and a single BS may transmit and receive data via multiple cells. Alternatively, a UE may transmit and receive data using multiple cells which are respectively controlled by two base stations. As described in the following descriptions, the case in which a single BS controls multiple cells is referred to as CA, and the case in which multiple cells controlled by two or more base stations are used is referred to as dual connectivity.

LTE Dual Connectivity Operation

Typical LTE technology supports dual connectivity for using radio resources of two BSs together. The dual connectivity operation may be configured such that multiple RX/TX UEs in the RRC-connected state are connected to two BSs connected via non-ideal backhaul, and the dual connectivity operation may use radio resources provided by two different schedulers respectively located in the two base stations.

In the case of dual connectivity, a UE may transmit and receive data via multiple cells provided by two or more BSs. Descriptions will be provided by referring to a main BS as a Master eNB (MeNB) and referring to a BS that provides a secondary cell as a Secondary eNB (SeNB).

To provide radio resources from the SeNB to the UE, an SeNB addition procedure may be used for configuring UE context with respect to the SeNB.

New Radio (NR)

3GPP currently conducts research on the next generation/ 5G radio access technology (hereinafter referred to as "NR" for ease of description). NR provides a new AS sub-layer above PDCP, to provide flow-based QoS.

FIG. 1 is a diagram illustrating an example of a layer 2 structure for new Radio Access Technology (New RAT).

As illustrated in FIG. 1, the main services and functions of the new AS sub-layer are as follows:

Mapping between a QoS flow and a data radio bearer;

Marking QoS flow ID in both DL and UL packets.

Also, a new user plane protocol layer is applicable to connections to the next generation core. A single protocol entity of the new user plane protocol layer may be configured for each individual packet data unit (PDU) session.

As requirements for the migration and the architecture for the next generation radio access technology, the radio access network (RAN) architecture may need to support tight interworking between NR and LTE. For the tight interworking between NR and LTE, LTE dual connectivity may be expected to be reused. Also, dual connectivity may be used between NR BSs in the NR. Dual connectivity in the NR environment may be defined as multi-connectivity. For example, the multi-connectivity may be defined as an operation mode of a UE for utilizing radio resources configured by an LTE BS and/or an NR BS (Multi-Connectivity: Mode of operation in which multiple Rx/Tx UEs in the connected mode are configured to utilize radio resources amongst E-UTRA and/or NR provided by multiple distinct schedulers connected via non-ideal backhaul).

NR may be established even in a high-frequency band (e.g., a high-frequency band of 6 GHz or more). In this instance, due to the link blockage of the high-frequency band and high transmission loss, SINR drops fast. This may cause unnecessary delay and deteriorate reliability when an NR BS desires to transmit a control plane RRC message or user plane data via an interface between the NR BS and a UE. Particularly, due to the drawback, it is difficult to provide a service such as URLLC or the like. To overcome such drawback, for example, duplicate transmission may be used such that a control plane RRC message is overlappingly transmitted via one or more wireless paths. As another example, to overcome such drawback, duplicate transmission may be used such that user plane data is to overlappingly transmitted via one or more wireless paths.

Radio Link Failure (RLF)

An RRC-connected UE may detect a Radio Link Failure (RLF) when the following cases occur:

The case in which a radio link failure is detected from a physical layer 1. detect an RLF when a related timer expires, which started when out-of-synchronization for a PCell/PSCell occurs (upon receiving N310 consecutive "out-of-sync" indications for the PCell from lower layers while neither T300, T301, T304 nor T311 is running: UE start T310)

2. T312, which started when a measurement report is triggered while T310 is running (Upon triggering a measurement report for a measurement identity for which T312 has been configured, while T310 is running), expires without receiving N311 consecutive in-sync indications or the like from lower layers, or the like (Upon receiving N311 consecutive in-sync indications from lower layers, upon triggering the handover procedure, upon initiating the connection re-establishment procedure, and upon the expiry of T310);

The case in which a random-access problem occurs in the MAC layer (upon random access problem indication from MCG MAC while neither T300, T301, T304 nor T311 is running); and The case in which the number of retransmissions in an RLC layer reaches the maximum number of retransmissions. For example, the case in which the number of retransmissions from a Master Cell Group (MCG) RLC reaches the maximum number of retransmissions for an SRB, a MCG DRB, or a split DRB (upon indication from MCG RLC that the maximum number of retransmissions has been reached for an SRB or for an MCG or split DRB).

The UE may take into consideration an RLF associated with an MCG. When the UE detects an RLF, the UE may store RLF information in VarRLF-Report. When AS security is not activated, the UE may exit from the RRC-connected state. That is, the UE may immediately enter an RRC IDLE state. Otherwise, that is, when the AS security is activated, the UE may perform an RRC connection re-establishment procedure.

The RRC connection re-establishment is successfully performed only when a related cell is prepared, that is, only when available UE context is prepared. When E-UTRAN grants re-establishment, Signaling Radio Bearer1 (SRB1) operation is resumed while the operations of other radio bearers remains suspended. The RRC connection re-establishment procedure may be initiated when a handover failure or an RRC connection reconfiguration failure occurs, in addition to when an RLF occurs.

As described above, the typical UE may perform an RRC connection re-establishment procedure when an RLF is detected.

Figure 2:
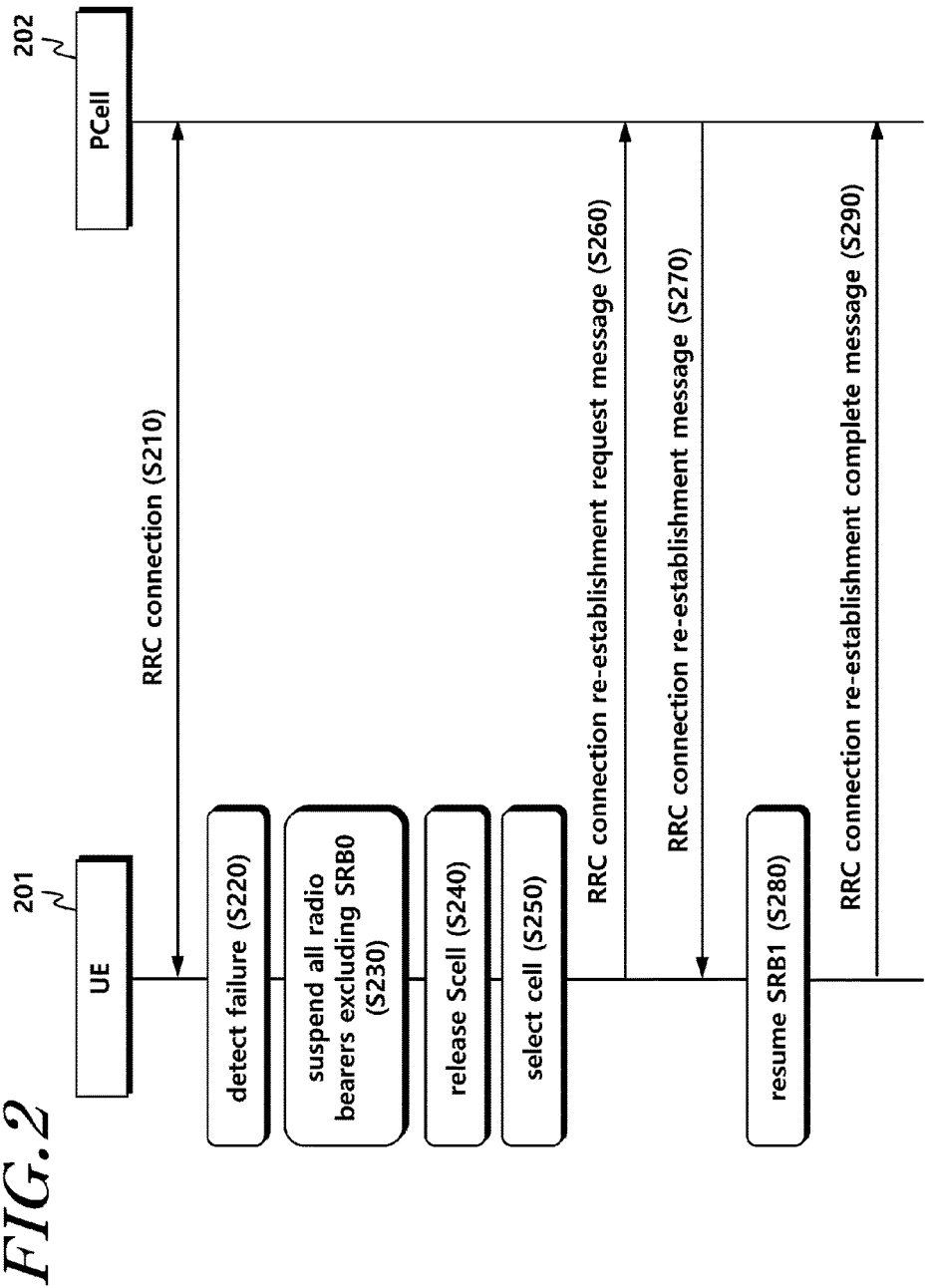
FIG. 2 is a diagram illustrating an radio resource control (RRC) connection re-establishment procedure.

FIG. 2 is a diagram illustrating an RRC connection re-establishment procedure.

Referring to FIG. 2, a UE 201 and a PCell 202 may configure an RRC connection in operation S210. In operation S220, the RRC-connected UE 201 may detect that a Radio Link Failure (RLF) occurs, based on various RLF conditions.

When the UE 201 detects an RLF and initiates an RRC connection re-establishment procedure, the UE 201 may suspend all radio bearers excluding SRB0 in operation S230. Also, when an SCell(s) has been configured, the UE 201 may release the SCell(s) in operation S240. Subsequently, the UE 201 may perform a cell selection process to select an appropriate cell in operation S250, and the UE 201 may transmit an RRC connection re-establishment request message in operation S260. The UE 201 may receive an RRC connection re-establishment message in operation S270.

Upon the receipt of the RRC connection re-establishment message, the UE 201 may re-establish PDCP for SRB1 and may re-establish RLC for SRB1. Also, the UE 201 may perform a radio resource configuration procedure according to received radio resource configuration dedicated (radioResourceConfigDedicated) information, and the UE 201 may resume SRB1 in operation S280. Through the above process, when an RRC connection is re-established, the UE 201 may transmit an RRC connection re-establishment complete message in operation S290.

Single-BS-Based Duplicate Transmission

A new radio access technology needs to provide Carrier Aggregation (CA) to increase data transmission rate and transmission capacity. For example, a UE may transmit data via multiple cells based on a single-BS-based CA. Hereinafter, descriptions will be provided using a term "cell", but a wireless path, a radio link, a carrier, or the like may be interchangeably used with the cell. As described above, in the present specification, the terms such as a wireless path, a radio link, a carrier, a cell, and the like may be used as a meaning that indicates a data path provided by a BS for data transmission and reception with a UE.

The UE may be configured to perform duplicate transmission via one or more cells when single-BS-based CA is provided. For example, the UE may be configured to overlappingly transmit a control plane RRC message via one or more cells. For another example, the UE may be configured to overlappingly transmit user plane data via one or more cells. However, a procedure and a technique associated with duplicate transmission using carrier aggregation have not been disclosed. Particularly, when single-BS-based duplicate transmission is performed, an RLF may occur during a duplicate transmission process via multiple cells. However, a detailed processing method thereof has not been provided. Therefore, according to a typical technology, the RRC re-establishment procedure needs to be performed when an RLF occurs in one of the multiple cells. This may cause a drawback in that an ineffective processing procedure is performed from the perspective of duplicate transmission of the same data.

Particularly, as a method of reliably transmitting a service with low latency, such as URLLC, in a radio access network, duplicate transmission via two or more wireless paths may be considered. However, when single-BS-based CA is configured for a UE, duplicate transmission using two wireless paths may not be supported by the CA. Particularly, when single-BS-based duplicate transmission is performed, an RLF may occur during a duplicate transmission process using multiple cells. However, a detailed processing method thereof has not been provided. Therefore, there is a drawback in that the ineffective RRC re-establishment procedure needs to be performed according to a typical technology.

The present disclosure devised to overcome the drawback is to provide a method and an apparatus for configuring duplicate transmission, which can effectively process a service, such as URLLC, when single-BS-based CA is applied. Particularly, the present disclosure is to provide a method and an apparatus for effectively processing an RLF when the RLF occurs during duplicate transmission.

The present disclosure may be applied to a radio access (e.g., LTE) network and a UE, in addition to a next generation mobile communication (5G mobile communication/NR) UE.

Hereinafter, for ease of description, a BS may indicate an eNodeB in LTE/E-UTRAN, which is an LTE BS, or such a BS may indicate an NR node, a Central Unit (CU), a Distributed Unit (DU), or a gNodeB in which a CU and a DU are implemented as a single logical entity in a 5G wireless network where the CU and the DU are separated, which is an NR BS. Hereinafter, descriptions will be provided using a term "NR BS" for ease of description, but all the above-described entities may fall into the scope of the present disclosure.

In NR-LTE, the following scenarios may be considered:
CA is applied by providing one or more NR cells and one or more LTE cells via an LTE BS;
CA is applied by providing one or more NR cells and one or more LTE cells to an NR BS;
CA is applied by providing one or more NR cells to an NR BS; and
CA is applied by providing one or more LTE cells to an LTE BS.

Hereinafter, for ease of description, the case in which an NR BS applies CA via one or more NR cells will be described. This is merely an example for ease of description, and the other above-described scenarios may fall into the scope of the present embodiment. Also, the case in which an LTE BS and an NR BS apply CA by respectively providing one or more LTE cells and one or more NR cells, and in parallel apply dual connectivity to a UE, may be included as an embodiment of the present disclosure. For example, in the case of LTE-NR dual connectivity in which an LTE BS is a master BS and an NR BS is a secondary BS, NR-LTE dual connectivity in which an NR BS is a master BS and an LTE BS is a secondary BS, and NR-NR dual connectivity in which an NR BS is a master BS and another NR BS is a secondary BS, a corresponding single BS may provide duplicate transmission by applying CA. This case may also be included in the embodiments of the present disclosure. That is, when multiple BSs or multiple NR BSs, which use different radio access technologies, configure dual connectivity, and a single BS configures carrier aggregation in parallel, the embodiment of the present specification may be applied.

An NR BS may control NR radio resources of a UE. The NR BS may performing one or more control functions, from among: adding/correcting/releasing/managing an NR cell/cell group/transmission point/transmission point group/transmission and reception point/transmission and reception point group/TRP/antenna/antenna group/beam (hereinafter referred to as a cell); NR measurement; NR measurement reporting, NR resource allocation; NR radio bearer adding/correcting/releasing; NR radio resource configuration; and NR mobility control. The NR BS may indicate one or more of the above-described control functions to a UE via an RRC configuration or reconfiguration message.

The NR BS may configure CA for a UE via one or more NR cells.

The NR BS may perform duplicate data transmission associated with CA, using a PDCP duplicate transmission function.

The PDCP entity of a BS may duplicate PDCP PDUs (or PDCP SDUs) having the same sequence number (SN) and submit the same to a lower layer, or may overlappingly submit PDCP PDUs (or PDCP SDUs) having the same SN, in order to perform duplicate data transmission via one or more radio cells.

The PDCP entity of a UE may receive PDCP PDUs (or PDCP SDUs) received via the one or more radio cells. For example, the PDCP entity may process data received earlier, and may discard overlapping data. As another example, a function of detecting and discarding overlapping data may be performed by the PDCP entity. For example, a transmission side may transmit data having the same PDCP SN via two paths, and a reception side may detect (or may detect and discard) overlapping data based on the PDCP SN. The BS may indicate configuration information used for indicating/processing such operation to the UE.

The PDCP entity of the UE may duplicate PDCP PDUs (or PDCP SDUs) having to the same sequence number (SN) and submit the same to a lower layer, or may overlappingly submit PDCP PDUs (or PDCP SDUs) having the same SN, in order to perform duplicate data transmission via one or more radio cells.

The PDCP entity of the BS may receive PDCP PDUs (or PDCP SDUs) received via the one or more radio cells. For example, the PDCP entity may process data received earlier, and may discard overlapping data. As another example, a function of detecting and discarding overlapping data may be performed by the PDCP entity. For example, a transmission side may transmit data having the same PDCP SN via two paths, and a reception side may detect (or may detect and discard) overlapping data based on the PDCP SN. The BS may indicate configuration information used for indicating/processing such operation to the UE.

In the case of user plane data, duplicate data transmission may be processed in a PDCP layer connected via a new AS sub-layer. Conversely, in the case of an RRC message, a new AS sub-layer may or may not be used.

As an example, in the case of an RRC message, duplicate data transmission may be processed in a PDCP via a new AS sub-layer. As another example, in the case of an RRC message, duplicate data transmission may be processed in the state of being directly connected to a PDCP without a new AS sub-layer.

To enable a single BS to perform duplicate transmission with a UE based on CA using the duplicate transmission function of the PDCP, the BS and the UE may be configured such that duplicate data transmission is performed via one or more NR cells provided by CA.

Figure 3:
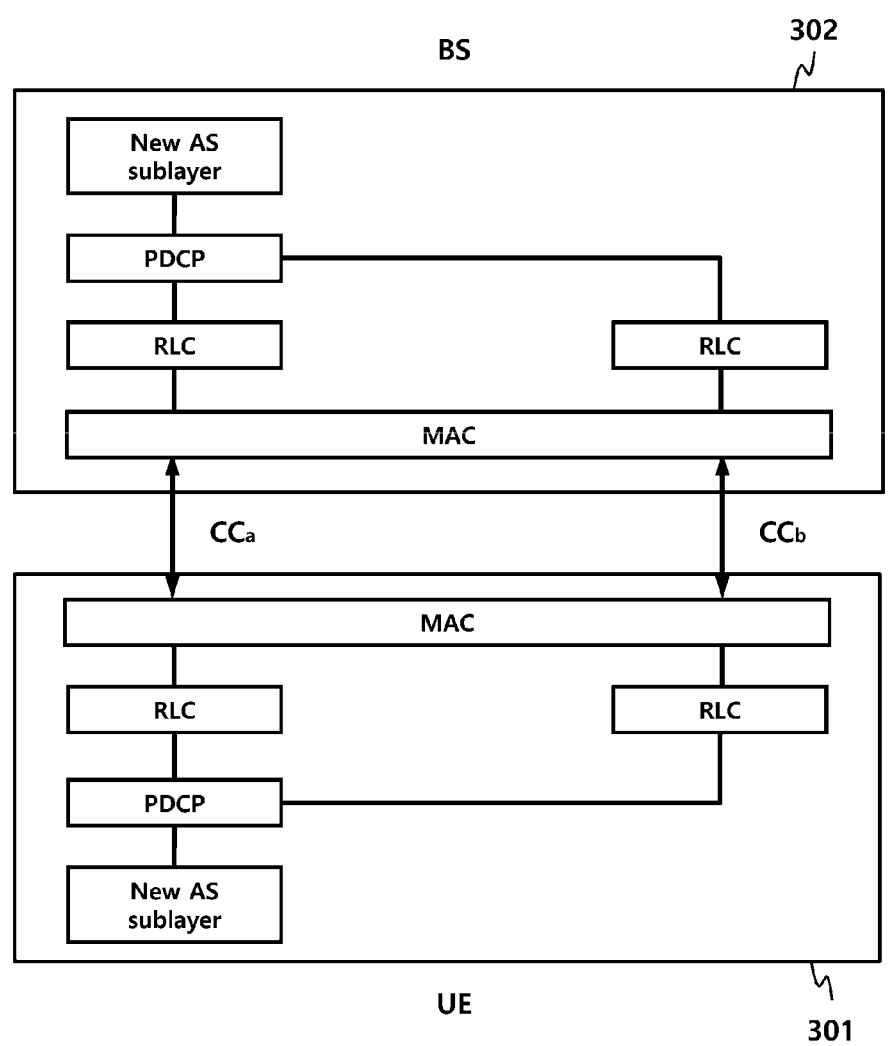
FIG. 3 is a diagram illustrating an exemplary structure for Carrier Aggregation (CA)-based duplicate data transmission.

FIG. 3 is a diagram illustrating an exemplary structure for Carrier Aggregation (CA)-based duplicate data transmission.

Referring to FIG. 3, a UE 301 and a BS 302 may perform duplicate transmission using one MAC entity. For example, the structure may be configured to overlappingly transmit data via one or more cells provided via CA using one MAC entity in the UE 301. To perform duplicate data transmission via one MAC entity in the UE 301, the BS 302 may be configured to include one or more RLC entities associated with one MAC entity and one or more logical channels, with respect to one radio bearer.

The MAC entity may include one or more cells. That is, the MAC entity may have one or more associated cells.

When a duplicate transmission function is configured, the logical channels belonging to one radio bearer may be respectively associated with or mapped onto one or more mutually exclusive cells. That is, duplicate data may be transmitted in a PDCP via different cells. In this instance, the UE 301 is configured to perform duplicate data transmission via one or more cells provided by the single BS 302 using CA and the UE 301 may reach the maximum number of retransmissions in the RLC layer.

Figure 4:
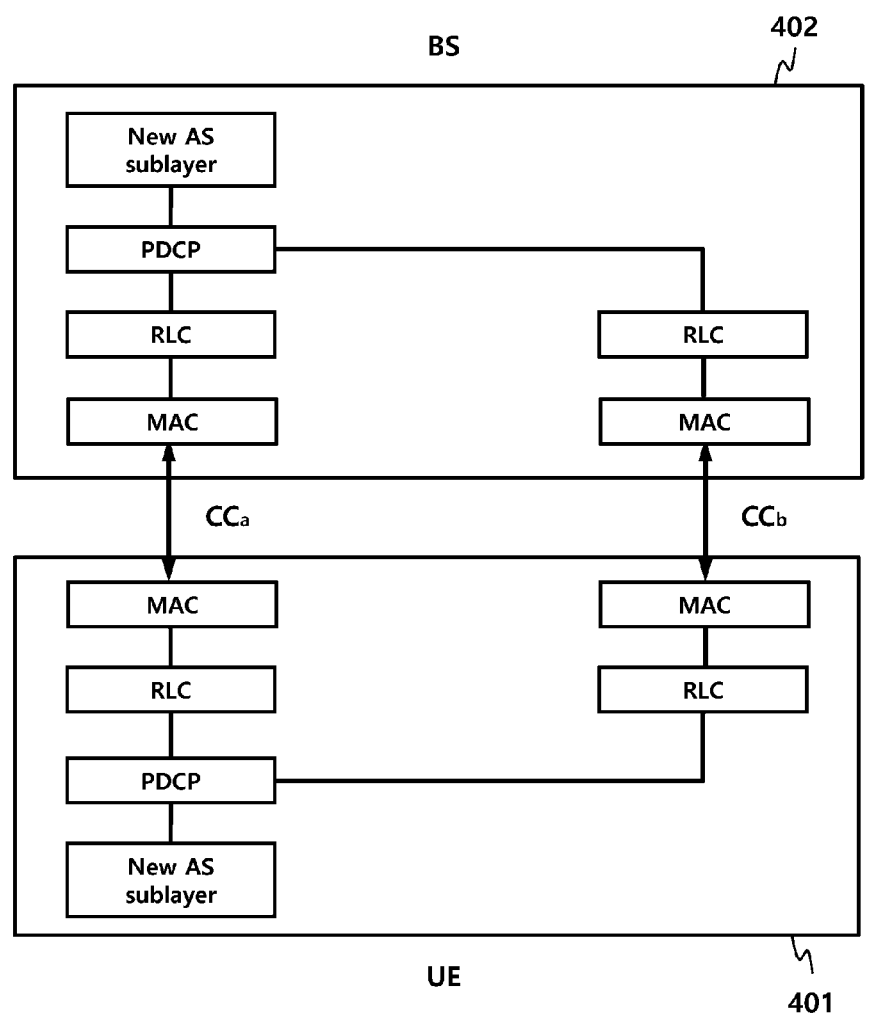
FIG. 4 is a diagram illustrating another exemplary structure for CA-based duplicate data transmission.
Figure 5:
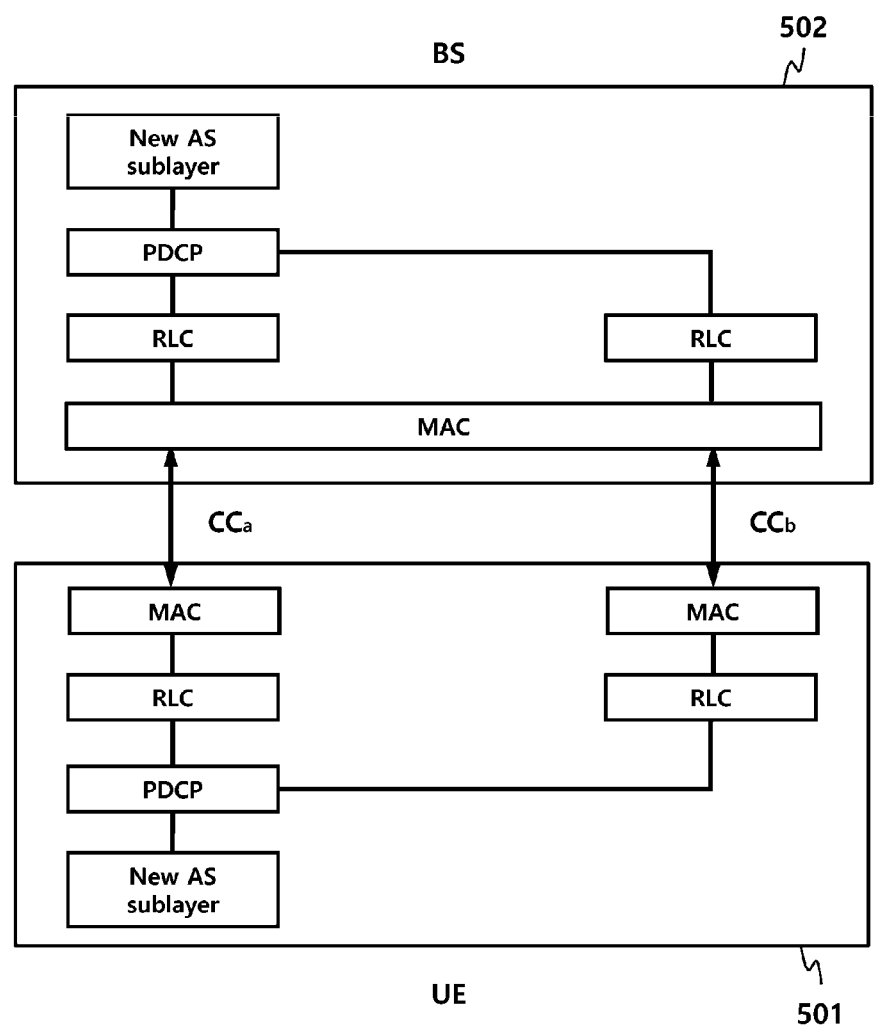
FIG. 5 is a diagram illustrating another exemplary structure for CA-based duplicate data transmission.

FIG. 4 is a diagram illustrating another exemplary structure for CA-based duplicate data transmission. FIG. 5 is a diagram illustrating another exemplary structure for CA-based duplicate data transmission.

Referring to FIG. 4 and FIG. 5, a UE 401 or 501 may be configured to perform duplicate data transmission via one or more cells provided by CA, using two MAC entities in the UE 401 or 501.

To perform duplicate data transmission via the two MAC entities in the UE 401 or 501, the BS 402 or 502 may need to create/establish a MAC entity for duplicate transmission (for ease of description, the MAC entity is referred to as a second MAC entity. That is, an existing MAC entity based on a single BS is referred to as a first MAC entity, and a MAC entity added for duplicate transmission based on a single BS is referred to as the second MAC entity). In this instance, the BS 402 or 502 may configure only one MAC entity, or the BS 402 or 502 may configure two MAC entities.

For example, when an RRC (reconfiguration) message including configuration information indicating single-BS-CA-based duplicate transmission is received, the UE 401 or 501 may generate the second MAC entity.

Unlike an SCG MAC entity that is configured by a BS (secondary BS) independent from a master BS based on dual connectivity, a single BS may configure the second MAC entity by directly and effectively setting detailed configuration information associated with two MAC entities.

For example, the first MAC entity and the second MAC entity may be set to perform an MAC procedure independently. The second MAC entity is used for the reliability of duplicate transmission rather than efficiency. Thus, the second MAC entity may be set to perform some or overall of the MAC procedure independently from the first MAC entity. The MAC procedure may be one or more procedures from among BSR, SR, LCP, and PHR For another example, the first MAC entity and the second MAC entity may be set to be coordinated to perform a MAC procedure. Although the second MAC entity is used for the reliability of duplicate transmission rather than efficiency, it may be efficient that the second MAC entity autonomously performs coordination for some of the MAC procedure. The MAC procedure may be one or more procedures from among BSR, SR, LCP, and PHR.

For still another example, the first MAC entity provides the most procedures processed by the two MAC entities, and the second MAC entity may merely perform some limited functions. For example, the second MAC entity may perform a function of associating data transmitted/received from a second RLC entity belonging to one radio bearer to a logical channel, a routing function related thereto, or a function of adding/removing information for distinguishing the same to/from a data header.

For yet another example, the first MAC entity triggers BSR or SR in consideration of both the logical channel in the first MAC entity and the logical channel included in the second MAC entity. A BSR transmitted by the first MAC entity to a BS may include the logical channel of the second MAC entity.

For further another example, the second MAC entity may not trigger a BSR

For further still another example, a PDCP entity, a first RLC entity, or a second RLC entity may transmit, to only the first MAC entity, data available for transmission.

Each MAC entity may distinguish logical channels associated with RLC entities belonging to one radio bearer. Each MAC entity may include one or more cells.

In this instance, a UE is configured to perform duplicate data transmission via one or more cells provided via single BS-based CA and may reach the maximum number of retransmissions in the RLC layer. In this instance, an embodiment associated with operations of the UE and the BS will be described with reference to drawings. The BS and the UE may process a duplicate transmission procedure separately using the methods to be described below or in combination thereof. Hereinafter, descriptions will be provided from the perspective of the case in which one radio bearer supports duplicate transmission via two RLC entities. This is merely an example for ease of description, the case in which duplicate transmission is supported via two or more RLC entities may fall into the scope of the present embodiment.

In the present specification, a PCell and an SCell are names by which cells included in carrier aggregation. The PCell is a cell for configuring/establishing/re-establishing an RRC connection between a UE and a BS, and the PCell may be a reference cell for handover. Also, the SCell is a cell that is additionally provided for carrier aggregation, which is distinguished from the PCell. One or more SCells may be configured. In the present disclosure, to provide Carrier Aggregation (CA)-based duplicate transmission, a UE or a BS may configure multiple RLC entities as illustrated in FIG. 3 to FIG. 5. Hereinafter, descriptions will be provided by referring a basic RLC entity that is associated with one radio bearer as a first RLC entity, and by referring an RLC entity that is additionally configured for duplicate transmission as a second RLC entity, as occasion needed. However, they are not limited by the names.

First Embodiment: Detect a Radio Link Failure (RLF) when the Number of RLC Retransmissions Reaches the Maximum Number of RLC Retransmissions in an RLC Entity FIG. 6 is a diagram illustrating operations of a UE according to an embodiment of the present disclosure.

Figure 6:
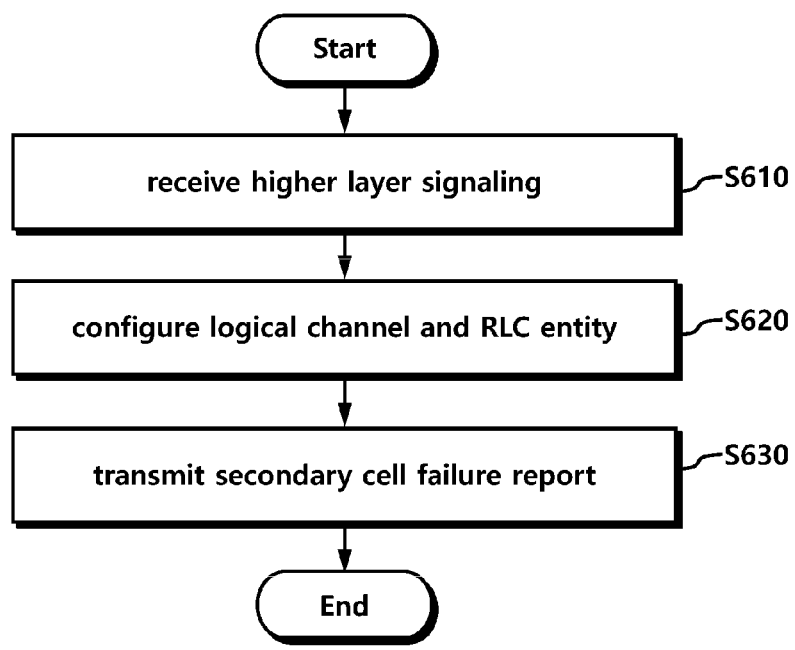
FIG. 6 is a diagram illustrating operations of a User Equipment (UE) according to an embodiment of the present disclosure.

Referring to FIG. 6, a UE may perform an operation of receiving, from a BS, higher layer signaling which includes information for configuring duplicate data transmission via single-BS-based Carrier Aggregation (CA) in operation S610. For example, the UE may receive, via an RRC message, information for configuring a function of duplicate data transmission via the above-described single-BS-based CA. For example, the RRC message may include information associated with a logical channel restricted to one or more secondary cells, and information for configuring a Radio Link Control (RLC) entity (e.g., a second RLC entity) for duplicate transmission.

The UE may perform an operation of configuring a logical channel restricted to the one or more secondary cells and an RLC entity for duplicate transmission, based on the higher layer signaling in operation S620. For example, the UE may configure an RLC entity for duplicate transmission and may configure the logical channel restricted to one or more secondary cells, using the RRC message received from the BS. The logical channel restricted to one or more secondary cells may be configured to be associated with the RLC entity configured for duplicate data transmission. Also, the logical channel restricted to the one or more secondary cells may be configured to be restricted to a secondary cell different from a primary cell. That is, the logical channel restricted to one or more secondary cells may indicate a logical channel used for transmitting, to the BS via the one or more secondary cells, data that is the same as data transmitted via the primary cell.

Through the above, the UE may configure the logical channel for duplicate transmission and the RLC entity, and the UE may overlappingly transmit the same data via carrier aggregation using single-BS-based multiple cells.

When an RLF occurs in the RLC entity, the UE may perform an operation of transmitting a secondary cell failure report to the BS without performing an RRC re-establishment procedure in operation S630. For example, an RLF may occur in the RLC entity when the above-described RLF occurrence condition is satisfied. That is, the RLF may be detected when the number of data retransmissions by the RLC entity reaches the maximum number of retransmissions. In addition, if a radio link monitoring (RLM) function is performed in a secondary cell, an RLF may be detected when the above-described RLF condition is satisfied. The RLM function may be performed in only the PCell (including a PSCell when a secondary BS exists). The PSCell indicates a cell that performs some of the functions of the primacy cell from among the secondary cells controlled by the secondary BS.

For example, when an RLF occurs in the RLC entity for duplicate transmission and a UE detects the RLF, the UE may transmit a secondary cell failure report to a BS. For example, when the number of retransmissions by the RLC entity for duplicate transmission reaches the maximum number of retransmissions, the corresponding RLC entity reports the same to an RRC layer, and the RRC layer may transmit a secondary cell failure report to the BS via an RRC message. In this instance, the RRC connection re-establishment procedure of FIG. 2 is not performed. That is, when an RLF is detected in the RLC entity configured for duplicate transmission, the UE may report a secondary cell failure report to the BS without RRC re-establishment procedure.

For another example, when an RLF is detected in an RLC entity (e.g., a first RLC entity) associated with a primary cell, the UE may re-establish an RRC connection according to the conventional RRC re-establishment procedure.

For still another example, when an RLF is detected in an RLC entity associated with a primary cell, the UE may perform an RRC re-establishment procedure, and when an RLF is detected in an RLC entity configured for duplicate transmission, the UE may transmit a secondary cell radio link failure report to the BS without an RRC re-establishment procedure. That is, different RLF processing procedures may be configured depending on an RLC entity.

The secondary cell radio link failure report may be transmitted to the BS via a primary cell.

Through the above, although an RLF occurs in the RLC entity which is used for duplicate transmission, the waste of resources and unnecessary latency may be prevented by re-establishing all radio links according to the conventional method.

Hereinafter, the operations according to the present embodiment will be described once again from the perspective of a first RLC entity and the perspective of a second RLC entity, respectively.

For example, the first RLC entity may be an RLC entity associated with a logical channel configured for transmitting data via a cell including a PCell (or a PSCell of a secondary BS). In this instance, it is set to detect an RLF when the first RLC entity reaches the maximum number of RLC retransmissions. When a UE detects an RLF, the UE may store RLF information in VarRLF-Report. When AS security is not activated, the UE may exit from an RRC-connected state. That is, the UE may immediately enter an RRC IDLE state. Otherwise, that is, when the AS security is activated, the UE may perform an RRC connection re-establishment procedure.

For another example, the second RLC entity may be an RLC entity associated with a logical channel configured for transmitting data via a cell that does not include a PCell (or a PSCell of a secondary BS). That is, the second RLC entity may be an RLC entity that is configured for duplicate transmission, and that is associated with a logical channel restricted to one or more secondary cells. In this instance, RLF processing may be differently performed for the second RLC entity. For example, it is set not to detect an RLF even though the second RLC entity reaches the maximum number of RLC retransmissions. For another example, the second RLC entity may be configured not to reach the maximum number of retransmissions. For still another example, in the case of the second RLC entity, when the number of retransmissions reaches the maximum number of RLC retransmissions, the UE may suspend the corresponding second RLC entity, or may indicate an RLF to a BS. In this instance, the RLF indication may be indicated via a first cell or a first cell group. Alternatively, the indication may be indicated via the first cell/cell group and/or a second cell/cell group. Here, the first cell or the first cell group may be defined as a cell including a PCell or a predetermined cell group (a PCell and a predetermined SCell indicated by a BS) for single-BS-based duplicate transmission. The second cell or the second cell group may be defined as a cell that is not included in the first cell or the first cell group (or an SCell or an SCell group that is not included in the first cell or the first cell group) for duplicate transmission. The BS may configure the same for the UE.

For another example, it is set to detect an RLF from any one RLC entity when the RLC entity reaches the maximum number of RLC retransmissions. In this instance, as described above, whether to perform an RRC connection re-establishment procedure may be determined depending on an RLC entity from which an RLF is detected. That is, when an RLF is detected in the first RLC entity, RRC connection re-establishment is performed. When an RLF is detected in the second RLC entity, an RLF report is transmitted to the BS without RRC connection re-establishment.

Figure 7:
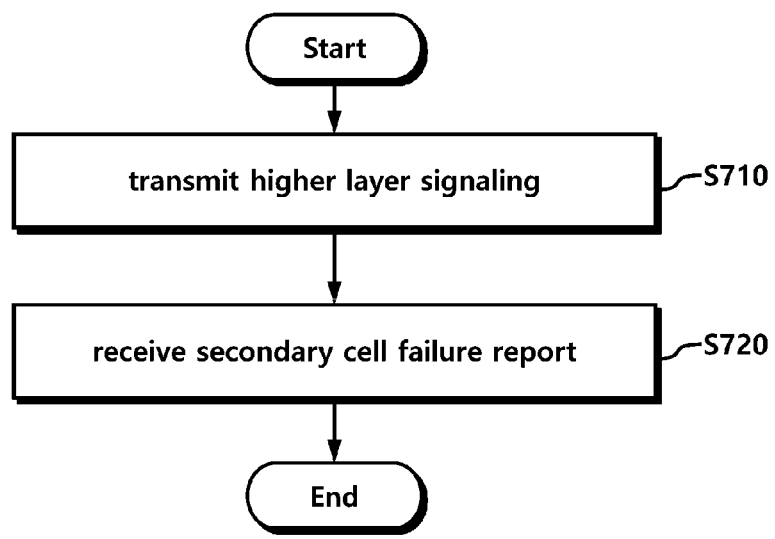
FIG. 7 is a diagram illustrating operations of a Base Station (BS) according to an embodiment of the present disclosure.

FIG. 7 is a diagram illustrating operations of a BS according to an embodiment of the present disclosure.

Referring to FIG. 7, a BS may perform an operation of transmitting, to a UE, higher layer signaling which includes information for configuring duplicate data transmission via single-BS-based Carrier Aggregation (CA) in operation S710. For example, the BS may transmit, to the UE via an RRC message, information for configuring a function of duplicate data transmission via the above-described single-BS-based CA. For example, the RRC message may include information associated with a logical channel restricted to one or more secondary cells, and information for configuring an RLC entity (e.g., a second RLC entity) for duplicate transmission. The UE may configure a logical channel restricted to one or more secondary cells and an RLC entity for duplicate transmission, based on the received higher layer signaling. For example, the UE may configure an RLC entity for duplicate transmission and may configure the logical channel restricted to one or more secondary cells, using the RRC message received from the BS. The logical channel restricted to one or more secondary cells may be configured to be associated with the RLC entity configured for duplicate data transmission. Also, the logical channel restricted to the one or more secondary cells may be configured to be restricted to a secondary cell different from a primary cell. That is, the logical channel restricted to one or more secondary cells may be a logical channel used for transmitting, to the BS via the one or more secondary cells, data that is the same as data transmitted via the primary cell.

When an RLF occurs in a Radio Link Control (RLC) entity configured for duplicate transmission based on the higher layer signaling, the BS may perform an operation of receiving a secondary cell failure report transmitted from the UE without an RRC re-establishment procedure, in operation S720. The BS may overlappingly receive the same data from the UE via multiple cells. For example, the BS may overlappingly receive data via a primary cell and a secondary cell. In this instance, the UE may transmit data to the BS via two RLC entities.

As described above, as the above-described RLF conditions occur, an RLF may be detected from each of the two RLC entities. That is, an RLF may be detected when the number of data retransmissions by the RLC entity reaches the maximum number of retransmissions. In addition, when the above-described RLF condition is satisfied, an RLF may be detected.

For example, when an RLF occurs in the UE's RLC entity for duplicate transmission and the UE detects the RLF, the BS may receive a secondary cell failure report from the UE. In this instance, the BS may not perform an RRC connection re-establishment procedure with the UE even though the RLF of the corresponding RLC entity occurs. Unlike the above, when an RLF is detected from the UE's RLC entity associated with a primary cell, the BS may perform RRC connection re-establishment with the UE according to the typical RRC re-establishment procedure. Alternatively, those two cases may be combined. When an RLF is detected in an RLC entity associated with a primary cell, the BS may perform an RRC re-establishment procedure with the UE, and when an RLF is detected in an RLC entity configured for duplicate transmission, the BS may receive a secondary cell radio link failure report from the UE without an RRC re-establishment procedure. That is, different RLF processing procedures may be performed depending on an RLC entity.

The BS may receive the secondary cell failure report via the primary cell. Alternatively, the BS may receive a failure report via another secondary cell, excluding a secondary cell from which an RLF is detected.

Through the above, although an RLF occurs in the RLC entity which is used for duplicate transmission, the UE and the BS can prevent the waste of resources and unnecessary latency by re-establishing all radio links according to a typical method.

Second Embodiment: Detect an RLF when Both a First RLC Entity and a Second RLC Entity Reach the Maximum Number of RLC Retransmissions In the case in which duplicate transmission is provided via different cells/cell groups using two logical channels and two RLC entities with respect to one bearer, when at least one RLC entity from among one or more RLC entities provided via the corresponding radio bearer normally operates, data transmission and reception may be performed. Therefore, in the case of a radio bearer that provides duplicate transmission, an RLF may be detected only when all RLC entities provided via the corresponding radio bearer reach the maximum number of RLC retransmissions. That is, when duplicate transmission is provided via multiple cells for one radio bearer, an RLF may be detected and processed only when all RLC entities configured for the multiple cells reach the maximum number of RLC retransmissions.

For example, it is set not to detect an RLF although the first RLC entity reaches the maximum number of RLC retransmissions. The UE may suspend the first RLC entity or interrupt transmission, or the UE may indicate the same to a BS. For example, the above-described indication to the BS may be performed via a second cell or a second cell group. Alternatively, the indication operation may be indicated via a first cell/cell group and/or a second cell/cell group. When the first RLC entity reaches the maximum number of RLC retransmissions (or in the state in which the UE suspends the first RLC entity/interrupts transmission or indicates the same to the BS as the first RLC entity reaches the maximum number of RLC retransmissions), and when the second RLC entity reaches the maximum number of RLC retransmissions, an RLF may be detected. When the UE detects an RLF, the UE may store RLF information in VarRLF-Report. When AS security is not activated, the UE may exit from an RRC-connected state. That is, the UE may immediately enter an RRC IDLE state. Otherwise, that is, when the AS security is activated, the UE may perform an RRC connection re-establishment procedure.

For another example, it is set not to detect an RLF although the second RLC entity reaches the maximum number of RLC retransmissions. The UE may suspend the corresponding second RLC entity or interrupt transmission, or the UE may indicate that the second RLC entity reaches the maximum number of RLC retransmissions to the BS. For example, the UE may indicate the same to the BS via the first cell or the first cell group. Alternatively, the UE may indicate the same to the BS via the first cell/cell group and/or the second cell/cell group. When the second RLC entity reaches the maximum number of RLC retransmissions (or in the state in which the UE suspends the second RLC entity/ interrupts transmission or indicates the same to the BS as the second RLC entity reaches the maximum number of RLC retransmissions) and when the first RLC entity reaches the maximum number of RLC retransmissions, an RLF may be detected. When the UE detects an RLF, the UE may store RLF information in VarRLF-Report. When AS security is not activated, the UE may exit from an RRC-connected state. That is, the UE may immediately enter an RRC IDLE state. Otherwise, that is, when the AS security is activated, the UE may perform an RRC connection re-establishment procedure.

As described above, when one of the multiple RLC entities reaches the maximum number of RLC retransmissions, the UE may not perform RRC connection re-establishment. Only when all RLC entities configured to perform duplicate transmission for one radio bearer reach the maximum number of RLC retransmissions, the UE may detect an RLF and may perform RRC connection re-establishment.

Third Embodiment: Set the Maximum Number of RLC Retransmissions to a Predetermined Value (e.g., Infinity) when Duplication Transmission is Provided Via CA FIG. 8 is a diagram illustrating an example of information included in uplink Acknowledged Mode (AM) RLC configuration information.

Referring to FIG. 8, a BS may indicate, to an AM RLC entity, 1 to 32 as the maximum number of retransmissions using uplink AM RLC configuration information. A maxRetxThreshold information element of FIG. 8 may be a parameter for an RLC AM. t1 corresponds to one retransmission, and t2 corresponds to two retransmissions. In the same manner, 32 retransmissions may be indicated. In the typical LTE, a default value is 4.

In the case in which one radio bearer supports duplicate transmission via two RLC entities, although an RLF happens in one RLC, data transmission may be performed when data transmission is allowed in the other RLC entity. Also, an RLF may happen in a physical layer before an RLC entity reaches the maximum number of retransmissions. Therefore, when one radio bearer supports duplicate transmission via two RLC entities, the BS sets the maximum number of retransmissions to a predetermined value, whereby configuring an RLC not to detect an RLF.

For example, the BS may set the maximum number of retransmissions to infinity. For another example, the BS does not indicate the maximum number of retransmissions, whereby configuring an RLC entity not to detect an RLF. For still another example, the BS may set the maximum number of retransmissions to infinity only for the second RLC entity. For yet another example, the BS does not indicate the maximum number of retransmissions only for the second RLC entity, whereby an RLF may not be detected from the RLC entity.

Fourth Embodiment: Use RLC UM

Figure 9:
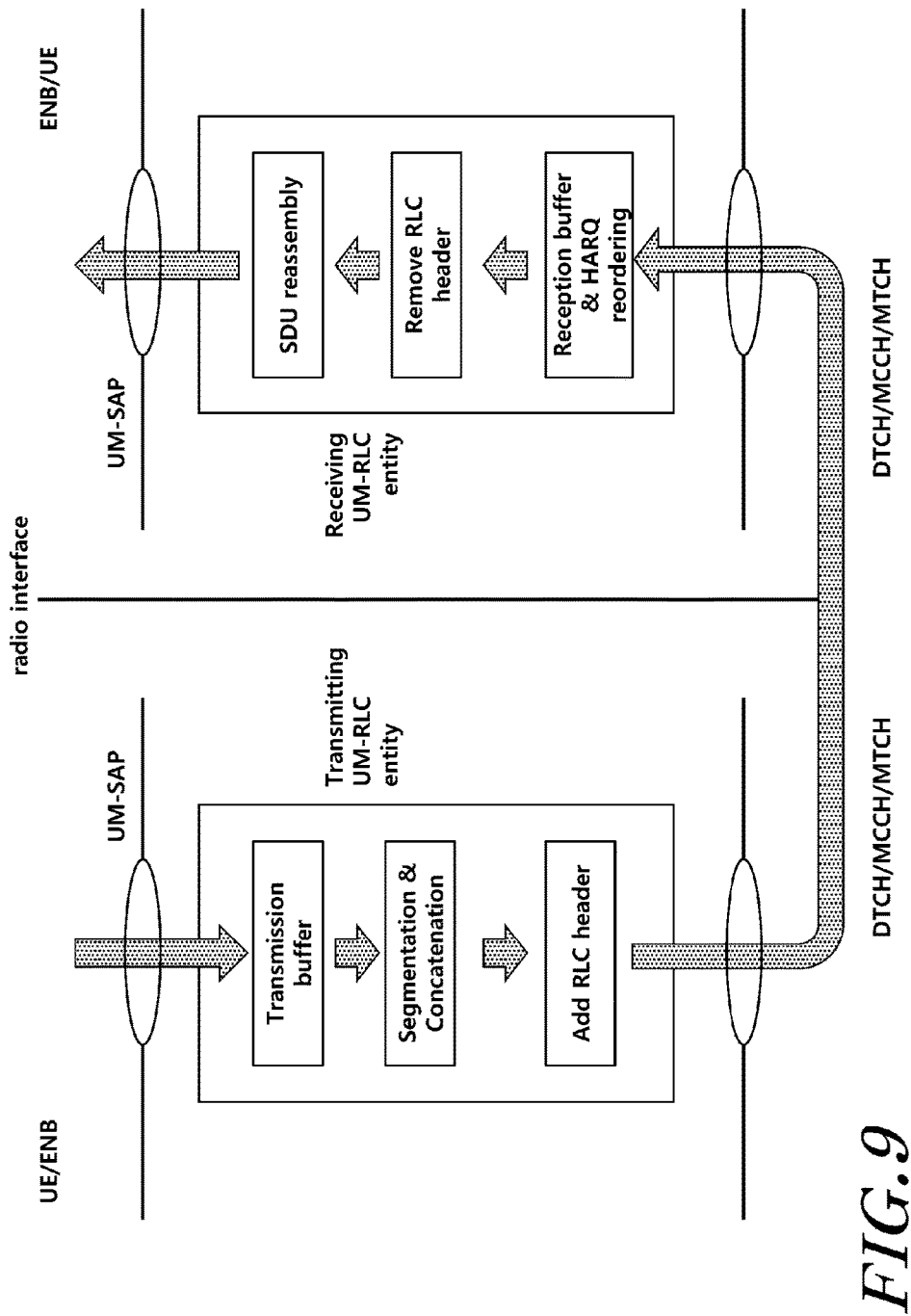
FIG. 9 is a diagram illustrating an Unacknowledged Mode (UM) RLC model according to an embodiment.

FIG. 9 is a diagram illustrating an Unacknowledged Mode (UM) RLC model according to an embodiment.

Referring to FIG. 9, unlike the acknowledge mode that performs retransmission in an RLC layer, an RLC unacknowledged mode (UM) may not perform retransmission. Therefore, an RLC entity may not experience an RLF attributable to retransmission. To prevent an RLC entity from experiencing an RLF attributable to retransmission, a BS may indicate usage of an RLC UM mode when the BS performs configuration such that one radio bearer provides PDCP duplicate transmission via two RLC entities.

For example, when the BS configures a function of duplicate transmission via two RLC entities based on single BS with respect to one radio bearer, the BS may indicate configuration of each RLC entity via an RLC UM. When an RLC entity configured for duplicate transmission is configured to be in an RLC UM, the corresponding RLC entity may not detect an RLF associated with the maximum number of RLC retransmissions since retransmission is not supported.

As described above, when duplicate data transmission of one radio bearer is performed via multiple RLC entities, the typical RRC connection re-establishment procedure associated with an RLF may not be performed according to the characteristic of duplicate transmission, or the typical RRC connection reestablishment procedure may be selectively performed. Therefore, unnecessary procedures may be avoided.

In the case of duplicate data transmission, there is a demand for a procedure and standard associated with the method of processing available data. Therefore, hereinafter, a method of processing available data (data available for transmission) in association with duplicate transmission will be described.

A buffer state reporting procedure is used to provide information associated with data available for transmission (hereinafter referred to as "available data" or "the amount of transmittable data" for ease of description) from uplink (UL) buffers of a UE associated with a MAC entity of a serving BS to a serving base station.

In the typical LTE, for reporting a MAC buffer state, a UE needs to take into consideration the following as data available for transmission in an RLC layer.

RLC SDUs, or segments (RLC SDUs or segments thereof that have not yet been included in an RLC data PDU)

RLC data PDUs or portions thereof (RLC data PDUs, or portions thereof that are pending for retransmission (RLC AM))

In the typical LTE, for reporting a MAC buffer state, the UE needs to take into consideration PDCP control PDUs and the following as data available for transmission in a PDCP layer.

For SDUs for which no PDU has been submitted to lower layers,
  the SDU itself, if the SDU has not yet been processed by the PDCP
  the PDU if the SDU has been processed by the PDCP In addition, when a PDCP entity performs re-establishment procedure with respect to a radio bearer mapped onto an RLC AM, the UE needs to take into consideration the following as the amount of data available for transmission in the PDCP layer.

Figure 10:
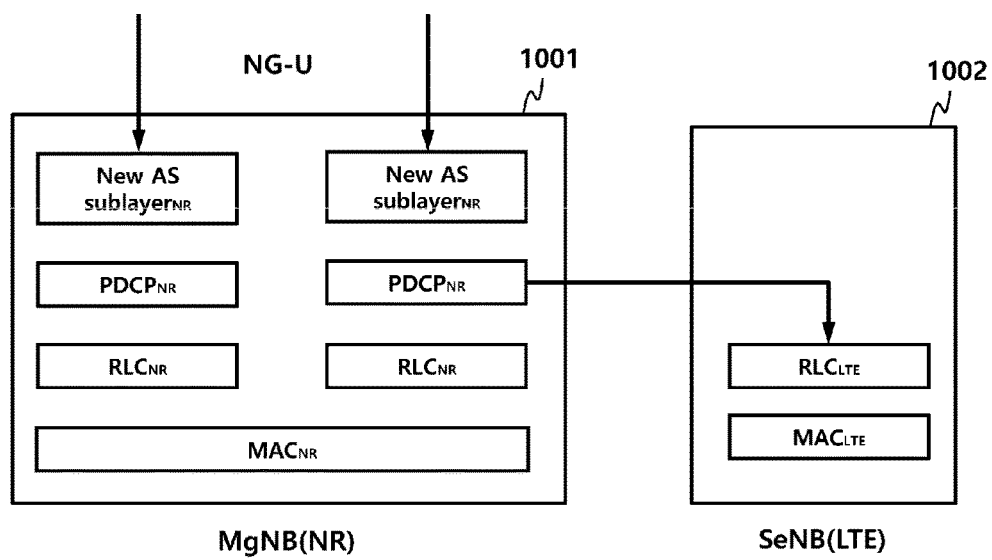
FIG. 10 is a diagram illustrating a structure of a split bearer in dual connectivity between BSs that use different radio access technologies.

Excluding SDUs of which successful transport is indicated by the PDCP state report, for SDUs for which PDUs are only submitted to lower layers before PDCP re-establishment, from a first SDU for transporting the corresponding PDUs that are not identified by lower layers,
  the SDU, if the SDU has not been yet processed by the PDCP
  the PDU that has been processed once by the PDCP FIG. 10 is a diagram illustrating the structure of a split bearer in dual connectivity between BSs that use different radio access technologies.

Referring to FIG. 10, an NR BS 1001 is configured as a master BS, and an LTE BS 1002 is configured as a secondary base station, whereby dual connectivity may be configured. In this instance, the master BS 1001 may be configured with a radio bearer for transmitting and receiving data via the cell of the master BS 1001, and a split bearer for transmitting and receiving data via the cells of the master BS 1001 and the secondary BS 1002. In the case of a split bearer, data is split at $PDCP_{NR}$ and may be transmitted to $RLC_{NR}$ and $RLC_{LTE}$, and the data may be transmitted via an NR cell and an LTE cell, respectively.

The following three cases may be considered as dual/multi connectivity for NR (hereinafter, dual connectivity is used for ease of description, but providing two or more connectivity may fall into the scope of the present disclosure).
  LTE (Master Node)—NR(Secondary Node)
  NR(Master Node)—NR(Secondary Node)
  NR(Master Node)—LTE(Secondary Node)

Dual connectivity described below may be applied to each of the above-described cases [LTE (Master Node)—NR (Secondary Node), NR(Master Node)—NR(Secondary Node), and NR(Master Node)—LTE(Secondary Node)].

When duplicate transmission is provided by a PDCP entity, available data may be processed in a UE by using the methods described below separately or in combination. This may be even applied to the case in which PDCP duplication transmission is performed via two BSs-based multiple cells, in addition to the case in which PDCP duplicate transmission is performed via multiple cells based on a single-BS-based CA. As an example of the case in which PDCP duplicate transmission is performed via multiple cells based on single-BS-based CA, the structures of FIG. 3 to FIG. 5 may be used. As an example of the case in which PDCP duplicate transmission is performed via two BSs-based multiple cells, the structure of FIG. 10 may be used. FIG. 10 illustrates the case of NR (Master Node)-LTE (Secondary Node), and another example of the case in which PDCP duplicate transmission is performed via two BSs-based multiple cells, dual connectivity structure in the case of LTE(Master Node)—NR(Secondary Node) may be used. In this instance, the New AS sub-layer of the master node may not be used.

First Embodiment; a Method of Indicating the Amount of Duplicate PDCP Data (that is, Double the Amount of PDCP Data) as Available Data with Respect to a Duplicate Transmission Bearer With respect to one radio bearer that provides duplicate transmission, a UE may indicate data available for transmission to an MAC entity in order to perform BSR triggering and calculating a buffer size. In this instance, the UE may perform as follows.

For example, when a condition/threshold for duplicate transmission is configured, and the duplicate transmission condition is satisfied (or when a duplicate transmission condition parameter is greater than or equal to a duplicate transmission threshold value, or when information indicating that a duplicate transmission condition is satisfied is received via a physical layer), the UE (a PDCP entity of the UE) may indicate double the amount of data buffered in the PDCP entity as the available data for transmission to the MAC entity. The UE may indicate the amount of data which is N times greater than the amount of data buffered in the PDCP entity that performs duplicate transmission via n wireless paths via n logical channels.

For example, as illustrated in FIG. 4 or FIG. 5, when the UE provides PDCP duplicate transmission using two MAC entities based on single-BS-based CA, the UE (a PDCP entity of the UE) may indicate the amount of data two times greater than the amount of data buffered in the PDCP entity as available data for transmission to a first MAC entity.

For another example, as illustrated in FIG. 3, when the UE provides PDCP duplicate transmission using one MAC entity based on single-BS-based CA, the UE (a PDCP entity of the UE) may indicate the amount of data two times greater than the amount of data buffered in the PDCP entity as available data for transmission to the MAC entity.

For still another example, for SDUs for which no PDU has been submitted to lower layers,
  the SDU itself, if the SDU has not yet been processed by the PDCP
  the PDU, if the SDU has been processed by the PDCP
The amount of data two times greater than the amount of PDCP available data, which is calculated as described above, may be indicated to a MAC entity.

For another example, for SDUs for which no PDU has been submitted to lower layers,
  the amount of data that is two times greater than PDCP available data which is calculated as the SDU itself, if the SDU has not yet been processed by the PDCP
  the PDU, if the SDU has been processed by the PDCP
The amount of PDCP available data, which is calculated as described above, may be indicated to a MAC entity. A PDCP duplicate function may be a function provided by the PDCP. Therefore, in the case in which a PDCP PDU is duplicated/copied by the PDCP, since double the amount of data has been calculated for PDCP PDUs, double the amount of SDU data and the original amount of PDU data may be indicated to the MAC entity of the UE.

As another example, for SDUs for which no PDU has been submitted to lower layers,
  the amount of data two times greater than the amount of PDCP available data which is calculated as the SDU itself, if the SDU has not yet been processed by PDCP when the SDU is being processed by the PDCP and PDCP duplication/copy has not been performed, double the amount of PDCP available data calculated based on the SDU (or PDU) may be indicated the PDU if the SDU has been processed by the PDCP (or if the SDU has been processed and duplicated/copied by the PDCP)

The amount of PDCP available data, which is calculated as described above, may be indicated to a MAC entity. A PDCP duplicate function may be a function provided by the PDCP. Therefore, in the case in which a PDCP PDU is duplicated/copied by the PDCP, since double the amount of data has been calculated for PDCP PDUs, double the amount of SDU data and the original amount of PDU data may be indicated to the MAC entity of the UE until the PDCP PDU is duplicated/copied.

Second Embodiment: A Method of Indicating the Original Amount of PDCP Data as Available Data with Respect to a Duplicate Transmission Bearer With respect to one radio bearer that provides duplicate transmission, a UE may indicate available data for transmission to an MAC entity to perform BSR triggering and calculating a buffer size. In this instance, the UE may perform as follows.

For example, when a condition/threshold for duplicate transmission is configured, and the duplicate transmission condition is satisfied (or when a duplicate transmission condition parameter is greater than or equal to a duplicate transmission threshold value, or when information indicating that a duplicate transmission condition is satisfied is received via a physical layer), the UE (a PDCP entity of the UE) may indicate the amount of data buffered in the PDCP entity as the available data for transmission to the MAC entity.

For example, as illustrated in FIG. 3, when the UE provides PDCP duplicate transmission using one MAC entity based on single-BS-based CA, the UE (a PDCP entity of the UE) may indicate the amount of data buffered in the PDCP entity as available data for transmission to the MAC entity.

As another example, as illustrated in FIG. 4 or FIG. 5, when the UE provides PDCP duplicate transmission using two MAC entities based on single-BS-based CA, the UE (a PDCP entity of the UE) may indicate the amount of data buffered in the PDCP entity as available data for transmission to each MAC entity.

For another example, as illustrated in FIG. 4 or FIG. 5, when the UE provides PDCP duplicate transmission using two MAC entities based on single-BS-based CA, the UE (a PDCP entity of the UE) may indicate the amount of data buffered in the PDCP entity as available data for transmission to a first MAC entity. In this instance, (the PDCP entity of the UE) may not indicate the amount of data buffered in the PDCP entity as available data for transmission to a second MAC entity (or may indicate 0).

As another example, for SDUs for which no PDU has been submitted to lower layers,
the SDU itself, if the SDU has not yet been processed by the PDCP
the PDU, if the SDU has been processed by the PDCP
The amount of PDCP available data, which is calculated as described above, may be indicated to a MAC entity.

For another example, for SDUs for which no PDU has been submitted to lower layers,
the SDU itself, if the SDU has not yet been processed by the PDCP
half the PDU, if the SDU has been processed by the PDCP The amount of PDCP available data, which is calculated as described above, may be indicated to each MAC entity.

Third Embodiment: A Method of Calculating a Buffer Size by Checking a Duplicate Transmission Condition Whether a duplicate transmission condition is satisfied is checked primarily, and when the duplicate transmission condition is not satisfied, the amount of PDCP available data may be indicated to a MAC entity according to the conventional method. When the duplicate transmission condition is satisfied, the above-described first embodiment or second embodiment may be applied.

An MAC entity of a UE may indicate MAC entity data to a serving BS via a buffer state reporting (BSR) according to the above-described embodiments.

As described in the above, according to the present embodiments, a UE can efficiently perform duplicate transmission via two different wireless paths when a single-BS-based CA is configured.

Hereinafter, a UE and a BS which are capable of performing some or all of the above-described embodiments will be described again with reference to drawings.

Figure 11:
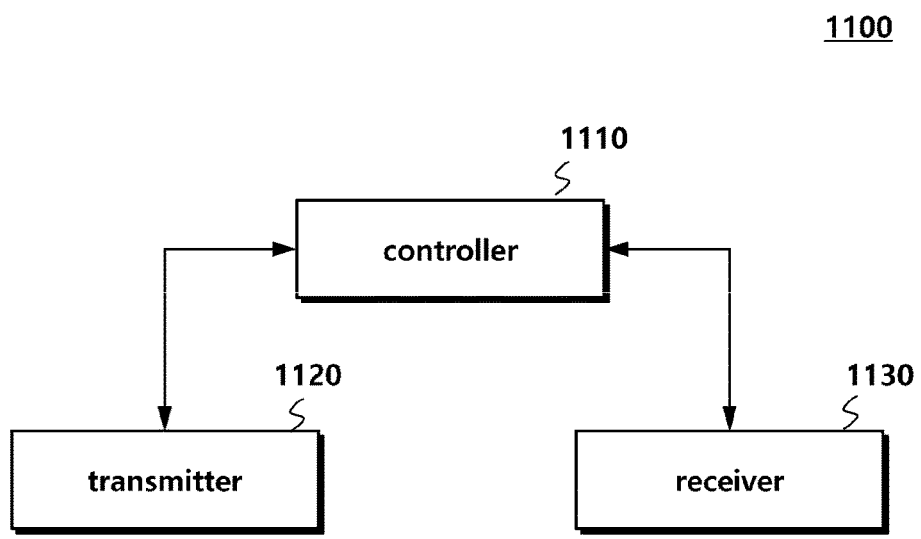
FIG. 11 illustrates a UE according to an embodiment.

FIG. 11 illustrates a UE according to an embodiment.

Referring to FIG. 11, a UE 1100 may include: a receiver 1130 configured to receive, from a BS, higher layer signaling including information for configuring duplicate data transmission via single-BS-based Carrier Aggregation (CA); a controller 1110 configured to configure a logical channel restricted to one or more secondary cells and a Radio Link Control (RLC) entity for duplicate transmission based on the higher layer signaling; and a transmitter 1120 configured to transmit, to the BS, a secondary cell failure report without an radio resource control (RRC) re-establishment procedure, when an RLF occurs in the RLC entity.

For example, the receiver 1130 may receive, via an RRC message, information for configuring a function of duplicate data transmission via the above-described single-BS-based CA. For example, the RRC message may include information associated with a logical channel restricted to one or more secondary cells, and information for configuring an RLC entity for duplicate transmission.

The controller 1110 may configure an RLC entity for duplicate transmission and may configure the logical channel restricted to one or more secondary cells using the RRC message received from the BS. The logical channel restricted to one or more secondary cells may be configured to be associated with the RLC entity configured for duplicate data transmission. Also, the logical channel restricted to the one or more secondary cells may be configured to be restricted to a secondary cell different from a primary cell. That is, the logical channel restricted to one or more secondary cells may be a logical channel used for transmitting, to the BS via the one or more secondary cells, data that is the same as data transmitted via the primary cell.

The transmitter 1120 may overlappingly transmit data of a radio bearer via multiple RLC entities associated with the corresponding radio bearer. Also, when an RLF occurs in the RLC entity for duplicate transmission and the RLF is detected, the transmitter 1120 may transmit a secondary cell failure report to the BS. For example, when the number of retransmissions by the RLC entity for duplicate transmission reaches the maximum number of RLC retransmissions, the corresponding RLC entity reports the same to an RRC layer, and the RRC layer may transmit a secondary cell failure report to the BS via an RRC message. In this instance, the controller 1110 may not perform an RRC connection re-establishment procedure. That is, when an RLF is detected in the RLC entity configured for duplicate transmission, the UE 1100 may report the secondary cell failure report to the BS without the RRC re-establishment procedure. For another example, when an RLF is detected in the RLC entity (e.g., a first RLC entity) associated with a primary cell, the controller 1110 may re-establish an RRC connection according to the conventional RRC re-establishment procedure. For still another example, the controller 1110 may perform control such that an RRC re-establishment procedure is performed when an RLF is detected in an RLC entity associated with a primary cell, and the controller 1110 may perform control such that a secondary cell radio link failure report is transmitted to the BS without the RRC re-establishment procedure when an RLF is detected in an RLC entity configured for duplicate transmission. The transmitter 1120 may transmit the secondary cell radio link failure report to the BS via a primary cell.

The above-described RLF may be detected when the number of data retransmissions by the RLC entity reaches the maximum number of retransmissions. In addition, the RLF may be detected when any one of the above-described RLF conditions is satisfied.

In addition, the receiver 1130 may receive, from the BS, downlink control information, downlink data, a message, through a corresponding channel. Also, the controller 1110 may control the overall operation of the UE in association with an RLF occurring when duplicate data transmission is performed via single-BS-based CA, which are required for implementing the above described embodiments. The transmitter 1120 transmits, to the BS, uplink control information, data, and a message, through a corresponding channel.

Figure 12:
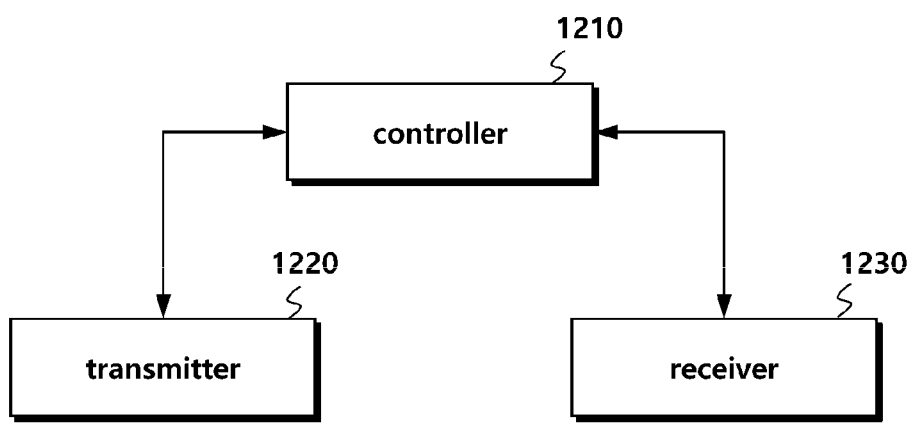
FIG. 12 illustrates a BS according to an embodiment.

FIG. 12 illustrates a BS according to an embodiment.

Referring to FIG. 12, a BS 1200 may include: a transmitter 1220 configured to transmit, to a UE, higher layer signaling including information for configuring duplicate data transmission via single-BS-based Carrier Aggregation (CA); and a receiver 1230 configured to receive a secondary cell failure report transmitted from the UE without an RRC re-establishment procedure when an RLF occurs in a Radio Link Control (RLC) entity configured for duplicate transmission based on the higher layer signaling. In this instance, the UE may configure a logical channel restricted to one or more secondary cells and an RLC entity for duplicate transmission, based on the higher layer signaling.

The transmitter 1220 may transmit, to the UE via an RRC message, information for configuring a function of duplicate data transmission via the above-described single-BS-based CA. For example, the RRC message may include information associated with a logical channel restricted to one or more secondary cells, and information for configuring an RLC entity for duplicate transmission.

The UE may configure a logical channel restricted to one or more secondary cells and an RLC entity for duplicate transmission, based on the received higher layer signaling. For example, the UE may configure an RLC entity for duplicate transmission and may configure the logical channel restricted to one or more secondary cells using the RRC message received from the BS. The logical channel restricted to one or more secondary cells may be configured to be associated with the RLC entity configured for duplicate data transmission. Also, the logical channel restricted to the one or more secondary cells may be configured to be restricted to a secondary cell different from a primary cell.

The receiver 1230 may overlappingly receive the same data from the UE via multiple cells. For example, the receiver 1230 may overlappingly receive data via a primary cell and a secondary cell. In this instance, the UE may transmit data to the BS via two RLC entities.

As described above, an RLF may be detected from each of the two RLC entities, as the above-described RLF condition occurs. That is, an RLF may be detected when the number of data retransmissions by the RLC entity reaches the maximum number of retransmissions. In addition, an RLF may be detected when any one of the above-described RLF conditions is satisfied.

For example, when an RLF occurs in the UE's RLC entity for duplicate transmission and the UE detects the RLF, the receiver 1230 may receive a secondary cell failure report from the UE. In this instance, the controller 1210 of the BS 1200 may not perform an RRC connection re-establishment procedure with the UE when an RLF of the corresponding RLC entity occurs. Unlike the above, when an RLF is detected from the UE's RLC entity associated with a primary cell, the controller 1210 of the BS 1200 may perform an RRC connection re-establishment with the UE according to the conventional RRC re-establishment procedure. Alternatively, those two cases may be combined. When an RLF is detected in an RLC entity associated with the primary cell, the BS 1200 may perform an RRC re-establishment procedure with the UE, and when an RLF is detected in an RLC entity configured for duplicate transmission, the BS 1200 may receive a secondary cell radio link failure report from the UE without the RRC re-establishment procedure. That is, different RLF processing procedures may be performed depending on an RLC entity.

The receiver 1230 may receive the secondary cell failure report via the primary cell. Alternatively, the receiver 1230 may receive a failure report via another secondary cell, excluding a secondary cell from which an RLF is detected.

In addition, the controller 1210 may control the overall operation of a BS for controlling the case in which an RLF occurs to the UE when duplicate data reception is performed via single-BS-based Carrier Aggregation (CA), which are required for implementing at least one of the above-described embodiments.

Also, the transmitter 1220 and the receiver 1230 are used for transmitting/receiving a signal, a message, and data needed for performing the operations in accordance with at least one embodiment.

The standard details or standard documents mentioned in the above embodiments are omitted for the simplicity of the description of the specification and constitute a part of the present specification. Therefore, when a part of the contents of the standard details and the standard documents is added to the present specifications or is disclosed in the claims, it should be construed as falling within the scope of the present disclosure.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

What is claimed is:

1. A method of processing a radio link failure by a User Equipment (UE), comprising:

receiving, from a Base Station (BS), higher layer signaling including information for configuring duplicate data transmission via single-BS-based Carrier Aggregation (CA);

configuring a logical channel, which is restricted to one or more secondary cells, and a Radio Link Control (RLC) entity for duplicate transmission, based on the higher layer signaling; and when a radio link failure occurs in the RLC entity, transmitting a secondary cell failure report to the BS without performing an RRC re-establishment procedure, wherein the RLC entity is configured in the UE for duplicate transmission to be associated with the logical channel directly formed between the BS and the UE.

2. The method of claim 1, wherein the higher layer signaling comprises information indicating the logical channel, which is restricted to the one or more secondary cells, and the RLC entity for duplicate transmission.

3. The method of claim 1, wherein the logical channel restricted to the one or more secondary cells is a logical channel for transmitting data, which is the same as data transmitted in a primary cell, to the BS via the one or more secondary cells.

4. The method of claim 1, wherein the secondary cell failure report is triggered when the number of times that the RLC entity retransmits data reaches the maximum number of retransmissions.

5. A method of controlling radio link failure processing of a User Equipment (UE), by a Base Station (BS), the method comprising:

transmitting, to the UE, higher layer signaling including information for configuring duplicate data transmission via single-BS-based Carrier Aggregation (CA); and receiving a secondary cell failure report transmitted from the UE without performing a radio resource control (RRC) re-establishment procedure when a radio link failure occurs in a Radio Link Control (RLC) entity configured for duplicate transmission based on the higher layer signaling, wherein the UE configures a logical channel, which is restricted to one or more secondary cells, and the RLC entity for duplicate transmission based on the higher layer signaling, and wherein the RLC entity for duplicate transmission is configured in the UE to be associated with the logical channel directly formed between the UE and the BS.

6. The method of claim 5, wherein the higher layer signaling comprises information for indicating the logical channel, which is restricted to the one or more secondary cells, and the RLC entity for duplicate transmission.

7. The method of claim 5, wherein the logical channel restricted to the one or more secondary cells is a logical channel for receiving data, which is the same as data received in a primary cell, from the UE via the one or more secondary cells.

8. The method of claim 5, wherein the secondary cell failure report is triggered when the number of times that the RLC entity retransmits data reaches the maximum number of retransmissions.

9. A User Equipment (UE) for processing a radio link failure, the UE comprising:

a receiver configured to receive, from a Base Station (BS), higher layer signaling including information for configuring duplicate data transmission via single-BS-based Carrier Aggregation (CA);

a controller configured to configure a logical channel, which is restricted to one or more secondary cells, and a Radio Link Control (RLC) entity for duplicate transmission, based on the higher layer signaling; and a transmitter configured to transmit a secondary cell failure report to the BS without performing radio resource control (RRC) re-establishment when a radio link failure occurs in the RLC entity, wherein the RLC entity is configured in the UE for duplicate transmission to be associated with the logical channel directly formed between the BS and the UE.

10. The UE of claim 9, wherein the higher layer signaling comprises information indicating the logical channel, which is restricted to one or more secondary cells, and the RLC entity for duplicate transmission.

11. The UE of claim 9, wherein the logical channel restricted to the one or more secondary cells is a logical channel for transmitting data, which is the same as data transmitted in a primary cell, to the BS via the one or more secondary cells.

12. The UE of claim 9, wherein the secondary cell failure report is triggered when the number of times that the RLC entity retransmits data reaches the maximum number of retransmissions.

* * * * *